United States Patent [19]
Pfaff

[11] Patent Number: 5,671,651
[45] Date of Patent: Sep. 30, 1997

[54] SERVOHYDRAULIC ACTUATOR

[75] Inventor: Roland Pfaff, Hafenlohr, Germany

[73] Assignee: Mannesmann Aktiengesellschaft, Dusseldorf, Germany

[21] Appl. No.: 504,702

[22] Filed: Jul. 20, 1995

[30] Foreign Application Priority Data

Jul. 20, 1994 [DE] Germany ............... 44 26 706.1

[51] Int. Cl.$^6$ ................................. F15B 11/00
[52] U.S. Cl. ......................................... 91/523
[58] Field of Search ............... 91/521, 523, 508, 91/374

[56] References Cited

U.S. PATENT DOCUMENTS

| | | | |
|---|---|---|---|
| 2,836,196 | 5/1958 | Gunn | 91/523 X |
| 3,333,413 | 8/1967 | Mercier et al. | 91/523 X |
| 3,486,418 | 12/1969 | Cryder et al. | 91/523 |
| 4,884,401 | 12/1989 | Metcalf et al. | 91/523 X |

FOREIGN PATENT DOCUMENTS

| | | |
|---|---|---|
| 3519211 | 12/1986 | Germany. |
| 3703019 | 8/1988 | Germany. |

*Primary Examiner*—Hoang Nguyen
*Attorney, Agent, or Firm*—Cohen, Pontani, Lieberman, Pavane

[57] ABSTRACT

In a servohydraulic actuator comprising a valve housing, a tandem cylinder, first and second servo valves operating synchronously and in axial alignment with one another in the valve housing and hydraulically connected to the tandem cylinder. Each of the first and second servo valves include an outer sleeve provided with inlet and outlet ducts and a control slide wherein one of the first and second servo valves are displaceable and the other servo valve is stationary. The displaceable valve includes a device for applying a resetting force acting against displacement of the valve. An intermediate sleeve separates the first and second servo valves and includes a coupling rod having an enlarged portion with a transverse opening which extends between and connects the control slides of the first and second servo valves. The actuator also includes an adjustment device for applying an externally controlled axial force against the resetting force to displace the outer sleeve of the displaceable servo valve.

7 Claims, 2 Drawing Sheets

5,671,651

SERVOHYDRAULIC ACTUATOR

BACKGROUND OF THE INVENTION

1. Field of the Invention

The present invention relates to servohydraulic actuators and, more particularly, to devices for adjusting servo valves to operate synchronously within a servohydraulic actuator.

2. Description of the Related Art

The use of servohydraulic actuators having a tandem cylinder controlled by two mechanical servo valves are well-known, especially in the field of vehicle engineering and aeronautics, e.g. in the main rotor actuator of a helicopter. In such actuators, it is well-known and preferable to use tandem cylinders which are controlled by two synchronously operated mechanical servo valves. In order to synchronously operate the two mechanical servo valves, they must be precisely balanced or tuned with each other. After long periods of operation, these servo valves are subject to wear of their control edge and thus become unbalanced. As it cannot be assumed that wear on the servo valves will occur to the same extent and at the same time in both servo valves they must be monitored and periodically adjusted. Due to the uneven wear over an extended period of time the servo valves will no longer operate synchronously and opposition between the two servo valves also known as "force fighting" will occur thus inhibiting operation of the actuator. In the past, in order to balance and tune the two servo valves for synchronous operation dismantling and re-adjusting of the actuator in a repair shop using tuning plates was needed. Such dismantling and re-adjusting of an actuator is a very time consuming and laborious operation.

It is thus desirable to provide a device for adjusting servo valves so they may operate synchronously and in balance without dismantling the actuator.

SUMMARY OF THE INVENTION

It is accordingly an object of the present invention to provide a servo hydraulic actuator using two synchronously running servo valves and an externally attached adjusting device for re-adjusting and providing balance to the servo valves without dismantling the actuator.

The present invention relates to servohydraulic actuators including a valve housing, a tandem cylinder and two servo valves operating synchronously and in axial alignment with one another. The two servo valves are positioned within the valve housing and are hydraulically connected to the tandem cylinder. Each servo valve includes an outer sleeve provided with inlet and outlet ducts and a control slide. One of the servo valves is axially displaceable while the other is stationary. The displaceable servo valve includes a resetting device acting against the displacement of the servo valves. An intermediate sleeve separates the two servo valves and includes a coupling rod having an enlarged portion with a transverse opening. The coupling rod extends between and connects the control slides of the servo valves. A device for applying an externally controlled axial force is positioned between the displaceable servo valve and the intermediate sleeve and acts against the resetting force to displace the outer sleeve of said displaceable servo valve thereby adjusting the displaceable servo valve and compensating for wear on either of the two servo valves.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings in which like numerals are used to denote similar elements.

DETAILED DESCRIPTION OF THE PRESENTLY PREFERRED EMBODIMENTS

The present invention will now be described with reference to FIGS. 1–3.

Figure 1:
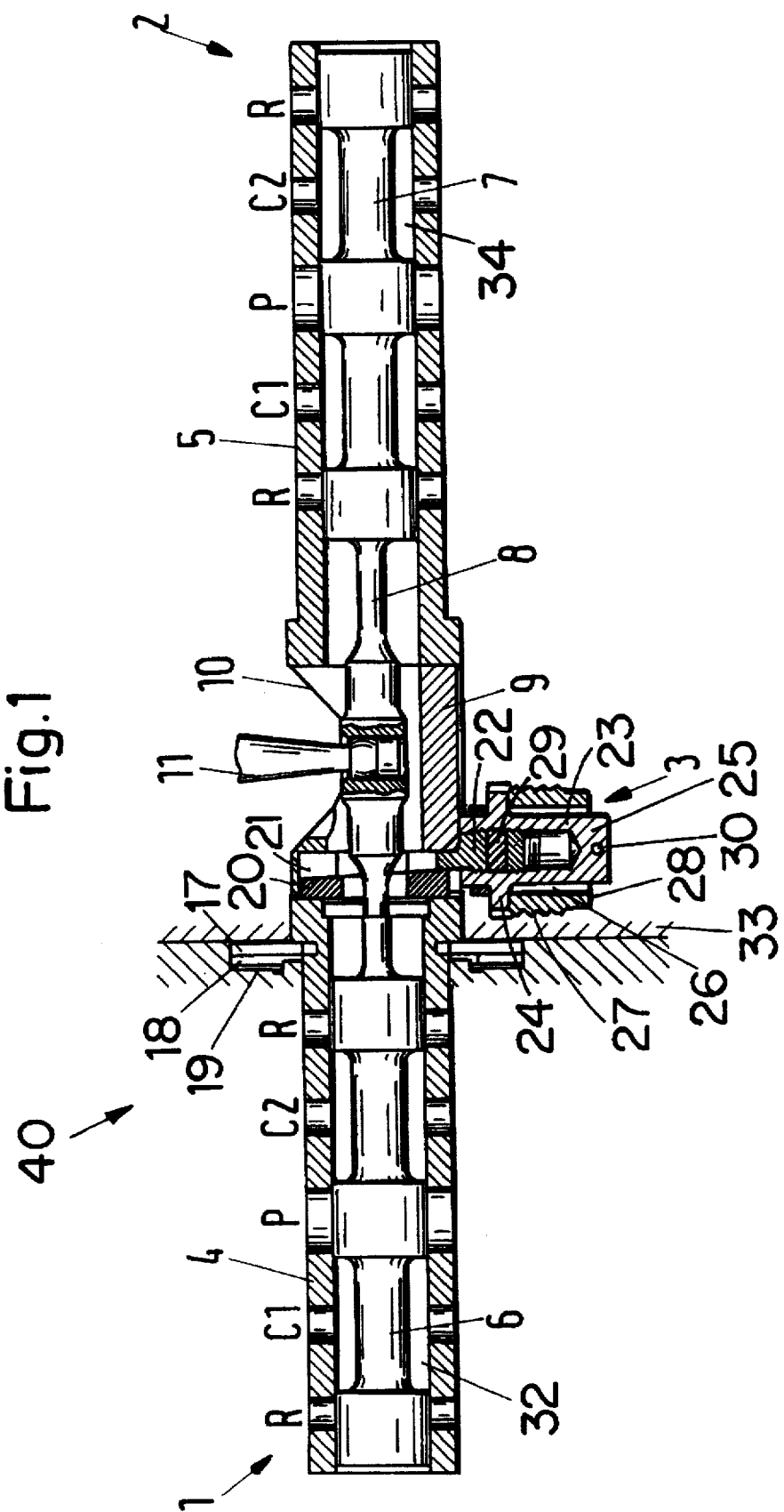
FIG. 1 is a top schematic cross-sectional view through two synchronously operating hydraulic servo valves including the adjusting device of the present invention.

FIG. 1 illustrates the servohydraulic actuator of the present invention indicated generally by the numeral 40. The servohydraulic actuator 40 includes two mechanical servo valves 1, 2 and an adjusting device 3 positioned therebetween. The servo valves 1, 2 are hydraulically connected to a tandem cylinder. The tandem cylinder, feedlines and outlet lines have been omitted from the figures as these parts and their connections within the actuator are well-known in the art and are not part of the inventive concept of the present invention.

The two servo valves 1, 2 are positioned in axial alignment with each other and an intermediate sleeve 9 is connected therebetween. The intermediate sleeve 9 includes a large opening 10 through which opening 10 an adjusting lever 11 extends. The adjusting lever 11 engages the device being controlled, e.g. the main rotor of a helicopter. Passing through the intermediate sleeve 9 is a coupling rod 8 which is connected between the two axial aligned servo valves 1, 2. The lever 11 is kinematically connected to the coupling rod 8. The use of such an adjusting lever and its connection to the actuator is well-known in the art and further discussion of such is not necessary.

Each of the servo valves 1, 2 include an outer sleeve 4, 5, respectively, having corresponding openings for a pressure line P, return lines R and work lines C1, C2. The sleeve 4, 5 of each servo valve forms a bore hole 32, 34 in which is placed a control slide 6, 7, respectively. The control slides 6, 7 of each servo valve are connected together through the coupling rod 8. Thus, the coupling rod 8 operatively connects the two axial aligned servo valves 1, 2.

In this arrangement, one of the servo valves is stationary in the valve housing 33 and the other servo valve is axially displaceable against a restoring or resetting force. In the figures shown, servo valve 1 is designed to be displaceable while servo valve 2 is designed to be stationary. The restoring force is supplied by the combination of a disk spring 17, stop plate 18 and tuning plate 19 which is more clearly shown in FIG. 2 and will be described hereinafter.

Figure 2:
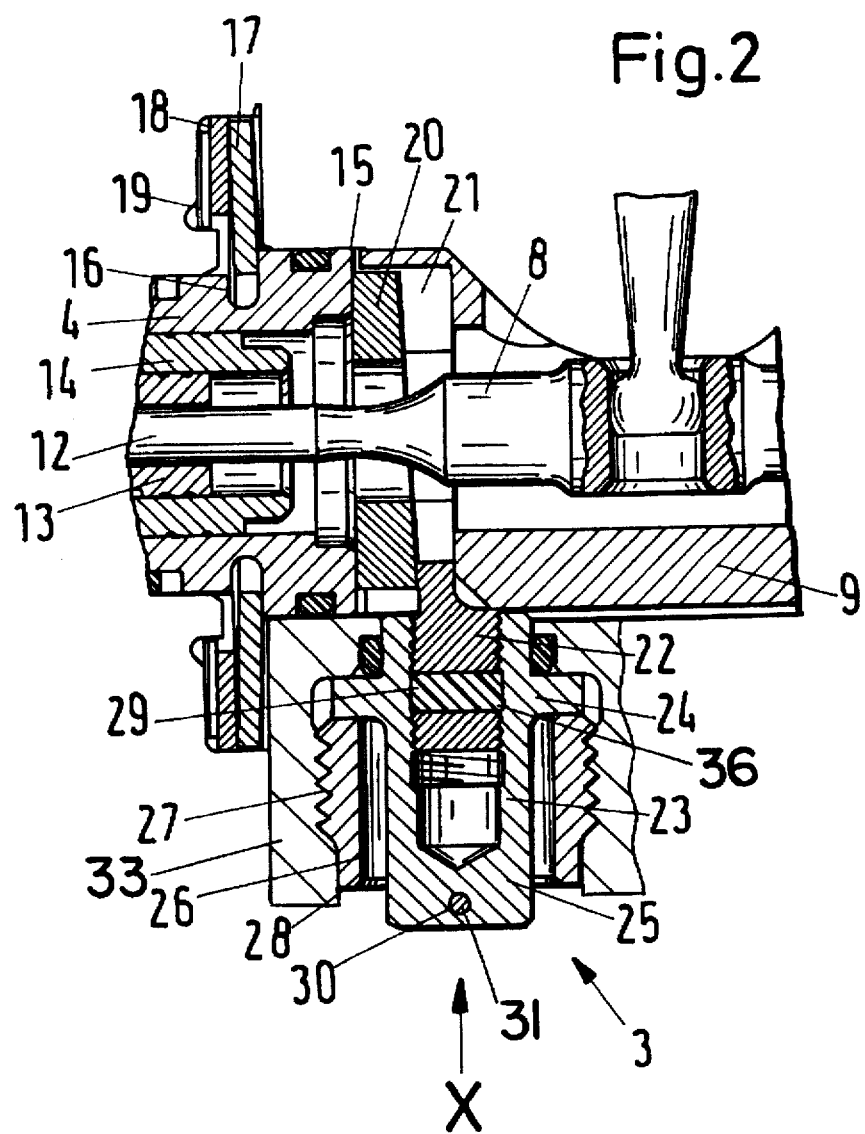
FIG. 2 is an enlarged top schematic cross-sectional view of the adjusting device in connection with a displaceable servo valve as shown in FIG. 1.

FIG. 2 shows an enlarged view of the adjusting device 3 and its interaction with the displaceable valve 1. In this figure, the displaceable valve 1 is constructed differently than in FIG. 1 in that the control slide is constructed of two parts including a push rod 12 and a sleeve 13 connected thereabout. The control slide is guided in a bypass sleeve 14 and not directly by the outer sleeve 4. This is a commonly used construction which ensures that the actuator can still be actuated when the control slide 12, 13 is jammed or clamped by the bypass sleeve 14.

The previously mentioned disk spring 17 engages a groove in the outer sleeve 4 and is supported in the valve housing 33 by the stop plate 18 and tuning fork 19. The stop plate 18 acts as a counter force to the disk spring 17 and prevents it from engaging and digging into both the housing and the tuning plate 19. The tuning plate 19 acts to regulate the tension of the disk spring 17. This tension is a predetermined initial amount which is obtained by selecting a suitable tuning plate 19. The predetermined tension acts to place the outer sleeve 4 in an initial position in which the valves 1, 2 operate synchronously.

The adjusting device 3 is positioned between the displaceable valve 1 and the intermediate sleeve 9. The adjusting device 3 includes a stationary wedge plate 20 and a radially displaceable wedge plate 21 arranged in and defining a separating space between the displaceable valve 1 and the intermediate sheet 9. The stationary wedge plate 20 does not move in the radial direction upon application from external force by the adjusting device 3. The outer sleeve 4 is held in contact at a point 15 with the stationary wedge plate 20 by the resetting force supplied by the disk spring 17. The disk spring 17 applies an axial force forwards the adjusting device 3 to maintain the contact between the outer sleeve 4 and the stationary wedge plate 20. The stationary and displaceable wedge plates 20, 21 each include a hole extending through a center portion allowing the rod 12 to pass through and connect with the coupling rod 8. Due to the shape of the displaceable wedge plate 21 and its position against the stationary wedge plate 20, when the displaceable wedge plate 21 moves in the radial direction, it exerts a force on both the stationary wedge plate 20 and the outer sleeve 4 contacting the stationary wedge plate 20 causing both the stationary wedge plate 20 and outer sleeve 4 to move axially either to the left or right as depicted in FIG. 2 dependent upon the direction of radial movement of the displaceable wedge plate 21. The stationary wedge plate 20 is supported in its position by an end side of the outer sleeve 4 and the radially displaceable wedge plate 21 is supported in position by an end side of the intermediate sleeve 9.

Motion of the displaceable wedge plate 21 is imparted by the adjusting device 3 which is connected thereto. An elongated portion 22 is connected to the radially displaceable wedge plate 21 and extends from the actuator. Due to the assembly of the device and the connection of the elongated portion 22, the displaceable wedge plate 21 opens at its top side to form a U-shaped wedge. This elongated portion 22 is threaded about an external surface thereof. The elongated portion includes a transverse bore hole 3 therethrough in which a plug 29 extends. The plug 29 is preferably made of Teflon but can be made of any material which will accomplish the desired function which will be explained hereinafter.

An adjusting sleeve 23 having a threading about an internal recess therein is coupled about the external surface of the elongated portion 22 through engagement between the threaded external surface of the elongated portion 22 and the threaded internal recess of the adjusting sleeve 23. The adjusting sleeve 23 includes a collar 24 and a front end region 25 having a hexagonal cross section as can be more clearly seen from FIG. 3. The adjusting sleeve 23 is rotatably supported at one end by the intermediate sleeve 9. The adjusting sleeve 23 may alternatively be rotatably supported by the stationary sleeve 2.

A positioning sleeve 26 may be attached onto the valve housing 33 whereby a front end of the positioning sleeve 26 is supported on the collar 24 of the adjusting sleeve 23 to thereby guard against unwanted rotation of the adjusting sleeve 23. The positioning sleeve 26 includes a threaded exterior side 27 and a hexagonally shaped head portion 28. The housing includes a recess having a threaded internal side wherein the adjusting sleeve 23 sits. The positioning sleeve 26 sits around the adjusting sleeve 23 and the threads of exterior side 27 engage the threaded side wall of the valve housing 33 in a screwlike manner.

The adjusting sleeve 23 and positioning sleeve 26 may also include a transversely extending bore hole 30 through which a securing wire 31 may be inserted. The insertion of the securing wire 31 through the bore hole 30 provides additional security from unintentional rotation of the adjusting sleeve 23 due to external forces such as strong vibrations caused by a helicopter rotor. The use of such a bore hole 30 and securing wire 31 combination is well-known and further discussion of such is not necessary.

Figure 3:
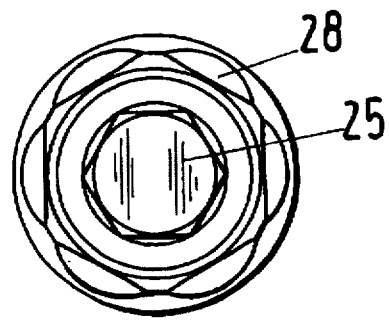
FIG. 3 is a side view of the adjusting device of the present invention taken in the direction of the arrow labeled "X" of FIG. 2.

FIG. 3 shows a side view of the adjusting device taken in the direction of the arrow labelled "X" in FIG. 2. This view illustrates the hexagonal cross section of both the front end region of the adjusting sleeve and the front end of the positioning sleeve 26.

In operation, the servo valves 1, 2 are operated normally and the positioning sleeve is in a closed position about the adjusting sleeve 23 thereby preventing rotation of the adjusting sleeve. The servo valves 1, 2 may be monitored by the use of two manometers connected thereto. The use of manometers to measure the pressure within a valve are well-known in the art thus no further discussion is necessary. The occurrence of wear on one or both of the valves is thus easily determined, i.e. a drift from the zero position determined by synchronizing the valves prior to use. If it is determined that such a drift from the zero position has occurred, the positioning sleeve 26 is open to using a suitable hexagonal wrench thereby exposing the adjusting sleeve for rotation. The adjusting sleeve may then be rotated either counterclockwise or clockwise dependent upon whether wear has occurred in either the stationary servo valve or in the displaceable servo valve. The plug 29 buries itself in the thread tips during screwing of the adjusting sleeve on the extending portion 22 ensuring a defined screwing path for the radially movable wedge plate, i.e. the rotation of the adjusting sleeve is transformed exactly into a forward feed path and accordingly eliminates troublesome thread backlash. Thus the rotation of the adjusting sleeve 23 is transformed into axial movement of the outer sleeve 4 in a sensitive manner without troublesome backlash. The ratio of rotation of the adjusting sleeve 23 to axial displacement of the outer sleeve 4 is dependent, for one, on the pitch of the thread of the adjusting sleeve 23 and on the inclination of the two cooperating wedge plates 20, 21. In order to prevent play during the displacement of the outer sleeve 4, the disk spring 17 presses against the sleeve 4. The amount of rotation of the adjusting sleeve 23 is thus dependent upon the amount of wear and the amount of displacement of the outer sleeve 4 needed to account for the wear. The adjusting sleeve 23 will be rotated until balance occurs between the two servo valves 1, 2.

The axial path of the positioning sleeve 4 corresponding to the rotation about the adjusting sleeve 23 can be determined by experimentation and calculation. In so doing, the pitch of the adjusting sleeve and the degree of inclination of the wedge plate pair must be taken into account. For example, a maximum total path of the displacement of the outer sleeve 4 amounting to ±0.06 mm corresponds to ±2.25 rotations of the adjusting sleeve 23 with a corresponding matching of the pitch of the adjusting sleeve 23 and the inclination of the wedge plate pair 20, 21. Different ratios can easily be given, since both the pitch of the adjusting sleeve 23 and the degree of inclination of the pair of wedge plates 20, 21 can be changed.

When the adjusting sleeve 23 is rotated in the counter clockwise direction, it will cause the extending section to extend further into the actuator and thus push the radially displaceable wedge piece 21 in the upwards direction with respect to its depiction in FIG. 2, i.e. out of the threaded recess. Movement of the radially displaceable wedge piece 21 in this direction allows for axial movement of the stationary wedge piece 20 and thus the outer sleeve 4 towards the intermediate section 9, i.e. to the right as depicted in FIG. 2, as a result of the force exerted on the outer sleeve 4 by the disk spring 17. Rotation of the adjusting sleeve 23 in the clockwise direction causes the extending section 22 to move along with the radially displaceable wedge piece 21 in a downward direction as depicted in FIG. 2, i.e. into the threaded recess. Movement of the wedge piece 21 in this direction exerts a force on the stationary wedge piece 20 and thus the outer sleeve 4 and disk spring 17 causing the stationary wedge piece 20 and outer sleeve 4 to be moved away from the intermediate section 9, i.e. to the left as depicted in FIG. 2. The rotation of the adjusting sleeve 23 is thus transformed into axial movement of the outer sleeve 4 and thus an amount of rotation of the adjusting sleeve 23 is proportional to an amount of axial displacement of the outer sleeve 4. This ratio formed is thus dependent on the pitch of the thread of the adjusting sleeve 23 and the inclination of the two cooperating wedge plates 20, 21 as described hereinbefore. The force of the disk spring 17 against the sleeve 4 also prevents play on the part of the sleeve 4 as it is being displaced. After rotation of the adjusting sleeve 23 and displacement of the outer sleeve 4 is complete, i.e. balance between the two servo valves as measured by the manometers is achieved, the positioning sleeve 26 is once again closed on the adjusting sleeve 23 thereby preventing rotation of the adjusting sleeve 23. A securing wire 31 may then positioned through a bore hole 30 in both the adjusting sleeve 23 and the positioning sleeve 26 to provide additional security against rotation of the adjusting sleeve 23. The servo valves 1, 2 are thus now balanced and can be run synchronously without dismantling the actuator.

Using the present invention, it is thus possible to monitor and balance synchronously running servo valves without dismantling the actuator by simply rotating and adjusting sleeve and axially displacing the outer sleeve of one of the servo valves.

The invention is not limited by the embodiments described above which are presented as examples only but can be modified in various ways within the scope of protection defined by the appended patent claims.

I claim:

1. A servohydraulic actuator, comprising:

a valve housing having an intermediate region;

first and second servo valves operating synchronously, in axial alignment and separated by said intermediate region from one another within said valve housing for use with a tandem cylinder through a hydraulic connection, each of said first and second servo valves including an outer sleeve provided with inlet and outlet ducts, and a control slide, said outer sleeve of said first servo valve being displaceable and said outer sleeve of said second servo valve being stationary;

means for applying a resetting force to said displaceable outer sleeve;

a coupling rod including an enlarged portion with a transverse opening for connection with an actuating element, said coupling rod extending through said intermediate region for connecting said control slides of said first and second servo valves; and adjusting means for applying an externally controlled axial force acting against said resetting force to displace said displaceable outer sleeve, said adjustment means comprising first and second wedge plates each including a recess therein and positioned between said first servo valve and said intermediate region, said coupling rod being positioned to extend through said recess in both said first and second wedge plates.

2. The servo hydraulic actuator of claim 1, wherein said outer sleeve of said displaceable servo valve includes an external groove and said means for applying said resetting force comprises a restoring disk spring engaging said external groove.

3. The servohydraulic actuator of claim 2, wherein said intermediate region includes an intermediate sleeve, and one of said first and second wedge plates is displaceable in a radial direction, said adjustment means further including an elongated portion connected to said displaceable wedge plate and including an external threaded side; and an adjusting sleeve including a first end including a threaded recess; a hexagonally shaped second end; and a collar region including a collar between said first and second ends, said threaded recess engaging said external threaded side of said elongated portion and said adjusting sleeve being rotatably supported by one of said outer sleeve of said second servo valve and said intermediate sleeve via said collar region.

4. The servohydraulic actuator of claim 3, wherein said valve housing includes a bore hole having an internal thread and said adjustment means further comprising a positioning sleeve supported on said collar of said adjusting sleeve and including a first hexagonally shaped end and a partially threaded external surface positioned in engaging relationship with said threaded bore hole of said valve housing.

5. The servohydraulic actuator of claim 4; further comprising a securing wire and said adjusting sleeve and said positioning sleeve each further including a transverse bore hole extending therethrough at an end remote from said wedge plates, said securing wire being positioned to extend through said bore hole in both said adjusting sleeve and said positioning sleeve.

6. The servohydraulic actuator of claim 3, further comprising a plug and said elongated portion includes a transversely aligned hole therethrough receiving said plug.

7. The servohydraulic actuator of claim 3, wherein said plug is made of Teflon.

* * * * *